Aug. 26, 1969 — F. D. HOWE ET AL — 3,463,386
FLUID SUPPORTED PISTON
Filed Oct. 6, 1967 — 3 Sheets-Sheet 1
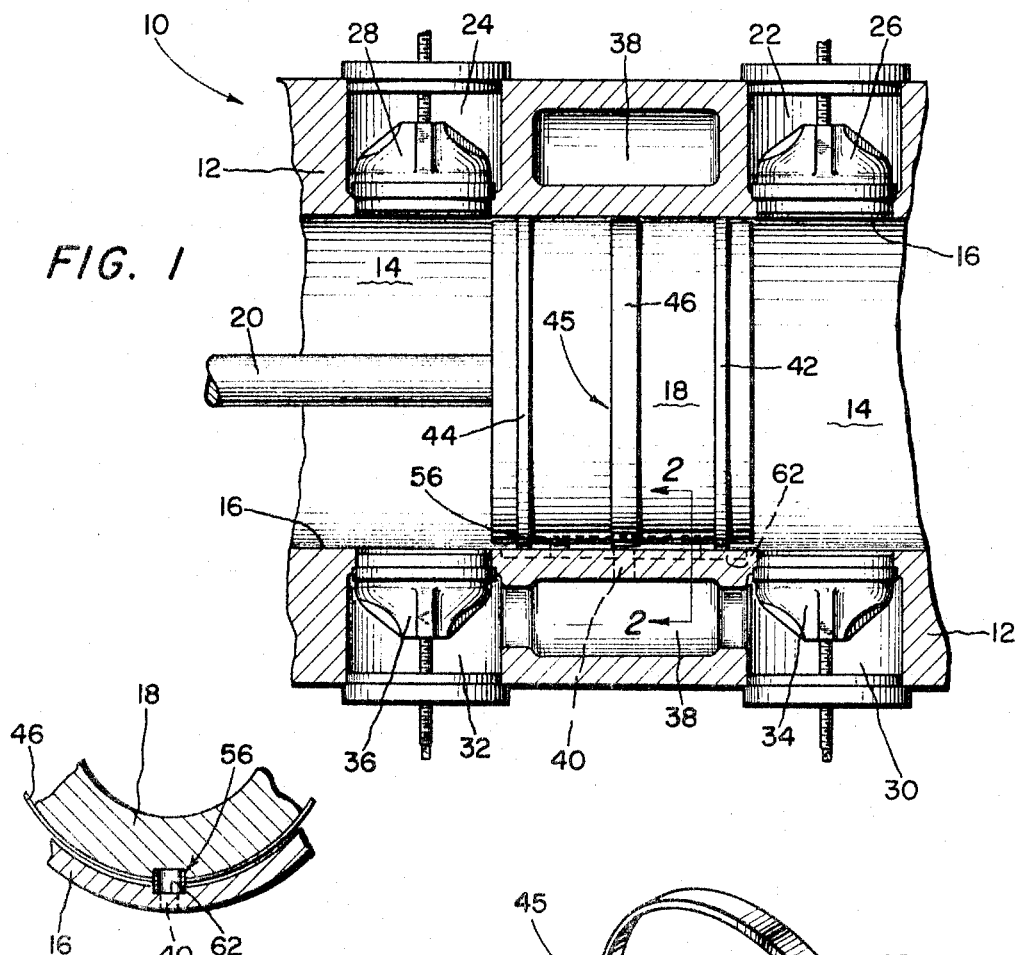
FIG. 1
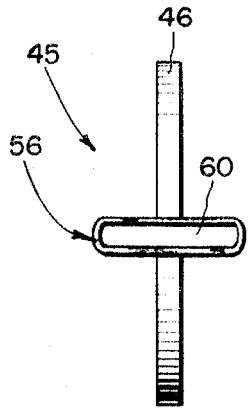
FIG. 2
FIG. 3
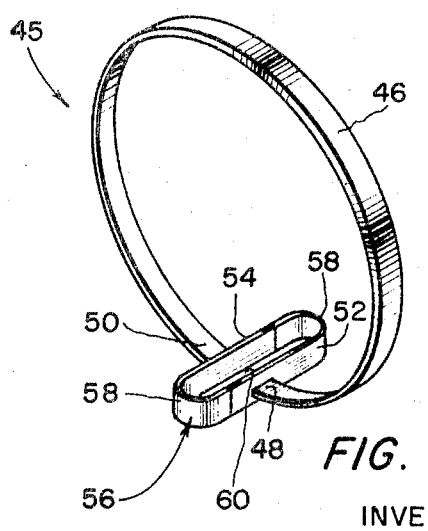
FIG. 4
INVENTORS
FRANK D. HOWE
ALLEN D. GROVES
ATTORNEY

INVENTORS
FRANK D. HOWE
ALLEN D. GROVES

*Robert L. Paquin*

ATTORNEY.

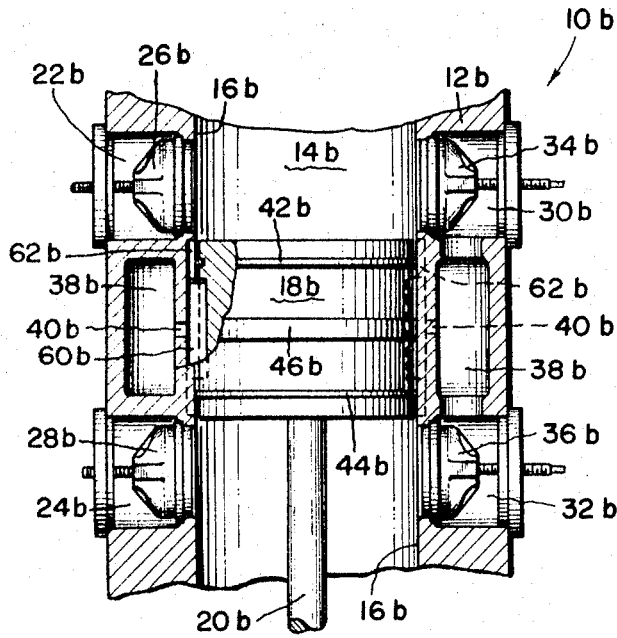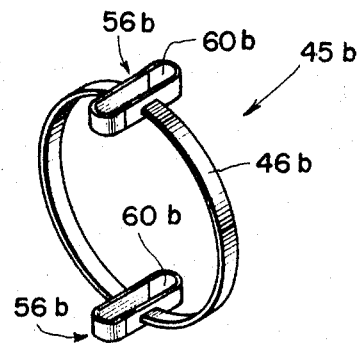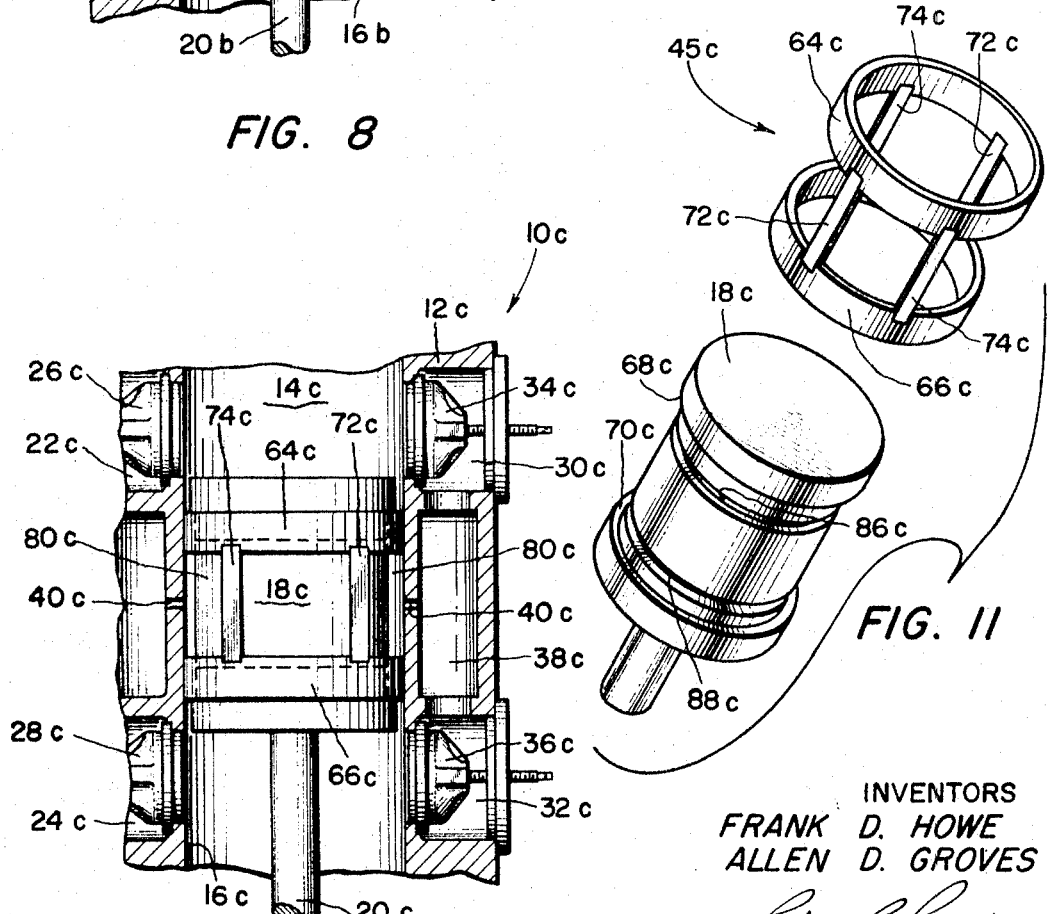

United States Patent Office 3,463,386
Patented Aug. 26, 1969

3,463,386
FLUID SUPPORTED PISTON
Frank D. Howe and Allen D. Groves, Painted Post, N.Y., assignors to Ingersoll-Rand Company, New York, N.Y., a corporation of New Jersey
Filed Oct. 6, 1967, Ser. No. 673,424
Int. Cl. F04b 39/02, 39/00
U.S. Cl. 230—188                                14 Claims

ABSTRACT OF THE DISCLOSURE

A reciprocating piston movably disposed in a cylinder bore and carrying sealing means peripherally enclosing a chamber which extends circumferentially along the piston for a substantial portion of the length thereof. A passage means, formed through the wall of the cylinder bore, communicates with the chamber throughout the reciprocation of the piston and supplies pressurized fluid thereto, whereby such fluid supports the piston within the cylinder bore.

BACKGROUND OF THE INVENTION

The present invention relates to pistons of the type employed in a cylinder bore of a piston-type compressor. More particularly, the invention has reference to the provision of a new and improved means for substantially reducing wear caused by sliding friction between a piston and the cylinder wall during the reciprocation of the piston.

Conventionally, the reciprocation of a piston in a cylinder bore of a piston-type compressor frequently is accompanied by sliding friction between the piston and the cylinder wall. This sliding friction causes wear of both the outer circumference of the piston and the cylinder wall and resultingly is a possible cause of premature failure of the compressor.

SUMMARY OF THE INVENTION

The principal object of the present invention is to provide a new and improved means for fluid supporting a piston in a cylinder bore to thereby substantially minimize the aforementioned sliding friction.

Another object of the invention is to provide a new and improved means of the type set forth which, although relatively simple and economical in construction, is highly efficient and dependable in operation.

In general, these objects, and those other objects and advantages of the invention which will be apparent from the following description taken in connection with the accompanying drawings, are attained by the provision of a sealing means circumferentially carried by the piston and extending longitudinally along the piston for a substantial portion of the length of the piston, this sealing means peripherally defining a chamber which also extends longitudinally along the piston for a substantial portion of the length of the latter. In addition, a passage means is provided for supplying pressurized fluid to the chamber during the reciprocation of the piston whereby the fluid thus supplied supports the piston within the cylinder bore. This passage means, moreover, preferably comprises a passage, connected to receive fluid discharged from the compressor cylinder, which is formed through the wall of the cylinder.

BRIEF DESCRIPTION OF THE DRAWINGS

FIG. 1 is a fragmentary, elevational sectional view of a compressor cylinder containing a piston provided with an embodiment of the present invention;
FIG. 2 is an enlarged, fragmentary sectional view taken on the line 2—2 of FIG. 1, looking in the direction of the arrows;
FIG. 3 is a bottom view of the ring assembly shown in FIGS. 1 and 2;
FIG. 4 is a view in perspective of such ring assembly;
FIG. 8 is a fragmentary elevational sectional view of a compressor cylinder containing a piston provided with a third embodiment of the invention;
FIG. 9 is a view in perspective of the ring assembly shown in FIG. 8;
FIG. 10 is a fragmentary elevational sectional view of a compressor cylinder containing a piston provided with a fourth embodiment of the invention;
and
FIG. 11 is an exploded view of the piston and ring assembly shown in FIG. 10.

DESCRIPTION OF THE PREFERRED EMBODIMENT

Figure 5:
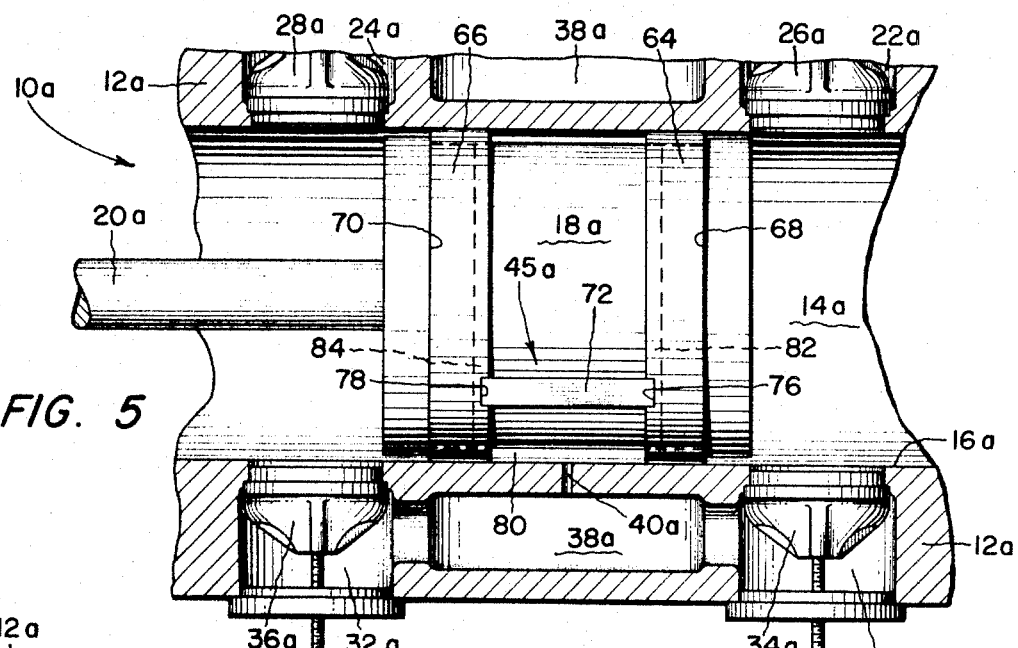
FIG. 5 is a fragmentary, elevational sectional view generally similar to FIG. 1, but illustrating a compressor cylinder containing a piston which is provided with an alternative embodiment of the invention.

Referring more particularly to the drawings wherein similar reference characters designate corresponding parts throughout the several views, FIG. 1 fragmentarily illustrates a compressor cylinder designated generally as 10 which comprises a generally horizontally disposed, cylinder body 12 containing a generally horizontal cylinder bore 14 peripherally defined by an annular wall 16. A generally horizontal piston 18 is slidably disposed within the cylinder bore 14 and rigidly mounted upon one end of a piston rod 20. The other end of the piston rod 20 is suitably connected to a conventional crank or other suitable driving means (not shown) such that, during the operation of the compressor, the piston 18 is reciprocated in the cylinder bore 14 in the conventional manner.

The cylinder 10 is provided with an inlet passage or bore 22 adapted to admit fluid into the cylinder bore 14 forwardly (that is, to the right as viewed in FIG. 1) of the piston 18 and an inlet passage or bore 24 adapted to admit fluid into the cylinder bore 14 rearwardly (that is, to the left as viewed in FIG. 1) of the piston 18. The inlet passages 22, 24 are each suitably connected in a conventional manner to a source (not shown) of the air or other fluid to be compressed in the cylinder bore 14. The inlet passages 22, 24, moreover, respectively contain conventional inlet valves 26, 28 which control the flow of such fluid into the cylinder bore 14.

The cylinder 10 also is provided with a discharge passage or bore 30 adapted to discharge compressed fluid from the cylinder bore 14 forwardly of the piston 18 and a discharge passage or bore 32 adapted to discharge such fluid from the cylinder bore 14 rearwardly thereof. The discharge passages 30, 32 respectively contain conventional discharge valves 34, 36 and are connected in a conventional manner to either a successive cylinder (not shown) of the compressor or a receiver or user of the compressed fluid. The discharge passages 30, 32 communicate with opposing ends of a fluid passage or bore 38, formed longitudinally in the cylinder body 12, which is connected with the cylinder bore 14 by a relatively small diameter passage or bore 40 located beneath the piston 18. Thus, during the operation of the compressor, a minor portion of the pressurized fluid discharged from the cylinder bore 14 through the discharge passages 30, 32 is continuously reintroduced thereto below the piston 18 by the bore 40.

The piston 18 circumferentially carries a sealing or piston ring 42 adjacent its forward end and a sealing or piston ring 44 adjacent its rearward end. The piston rings 42, 44 are of conventional construction and serve to prevent fluid leakage circumferentially around the piston 18. The piston 18, in accordance with the present invention, is provided with a ring assembly indicated generally as 45 which is particularly constructed and arranged to support the piston 18 upon the pressurized fluid admitted into the cylinder bore 14 through the bore 40.

The ring assembly 45, as illustrated in FIGS. 3 and 4, essentially comprises a generally annular, support ring 46 and an elongated, endless sealing loop 56 carried by the support ring 46 and preferably molded integrally therewith from any suitable conventional piston ring material. More particularly, the support ring 46 includes aligned, spaced ends 48, 50 rigidly connected to opposing side walls 52, 54 of the sealing loop 56. The sealing loop 56 is generally ovate in configuration and includes arcuately contoured, end walls 58 which cooperate with the side walls 52, 54 to peripherally enclose an open sided chamber 60 also generally ovate in shape. The sealing loop 56, as will be noted, is hence constructed such that its elongation, and that of the chamber 60, extend in a direction lateral to the support ring 46. The sealing loop 56, moreover, is constructed of sufficient length whereby, when the ring assembly 45 is installed upon the piston 18, the chamber 60 extends for a substantial portion of the length of the piston 18.

As illustrated in FIG. 1, the ring assembly 45 is mounted on the piston 18 by positioning the support ring 46 circumferentially around the latter intermediate the piston rings 42, 44. The sealing loop 56 is arranged to depend below the piston 18 into a groove 62, longitudinally formed in the cylinder wall 16 in communication with the bore 40, for horizontal and vertical slidable movement therein throughout the reciprocation of the piston 18. The piston 18, as shown in FIG. 2, closes the upper open side of the chamber 60 such that only the lower side of the latter remains open. This installation, as will be seen, positions the sealing loop 56 such that its side walls 52, 54 extend circumferentially along the piston 18 for a substantial portion of the length of the latter and, resultantly, causes the chamber 60 to extend longitudinally along the piston 18 for a substantial portion of the length thereof. Thus, during the operation of the illustrated cylinder 10, the bore 40 remains in communication with the chamber 60 throughout the reciprocation of the piston 18.

More particularly, during the reciprocation of the piston 18, pressurized fluid from the fluid passage 38 flows through the bore 40 into the chamber 60 and, as it becomes entrapped in the latter, raises the piston vertically off the lower end of the cylinder wall 16. The weight of the piston 18, due to the generally horizontal positioning of the latter, however, sufficiently opposes this pressurized fluid to prevent the piston 18 from being forced into excessive frictional contact with the upper portion of the cylinder wall 16. Hence, the piston 18 is, in essence, fluid supported in the cylinder bore 14 by the fluid in the chamber 60.

Figure 6:
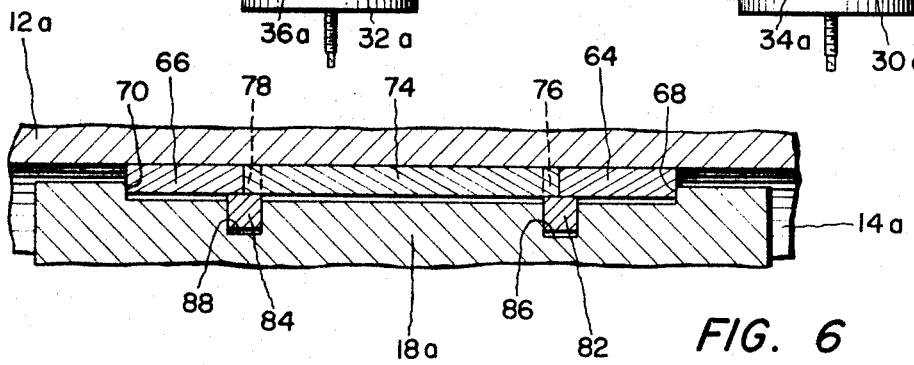
FIG. 6 is an enlarged, fragmentary elevational sectional view showing such embodiment of the invention.
Figure 7:
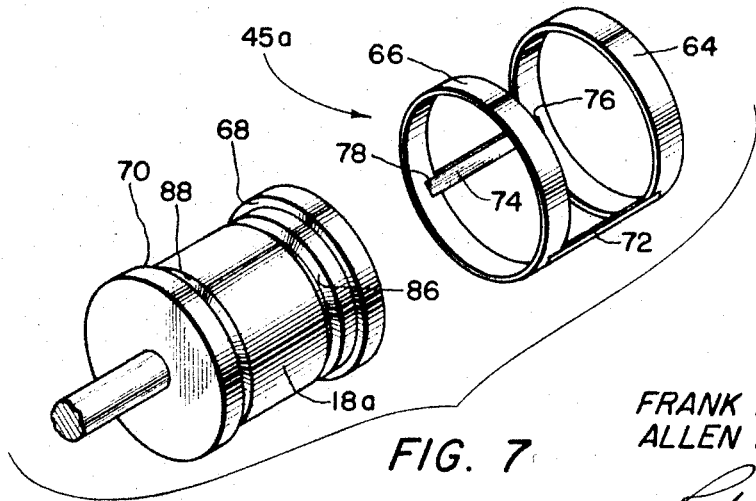
FIG. 7 is an exploded view of the ring assembly and piston shown in FIGS. 5 and 6.

FIGS. 5 through 7 illustrate a generally horizontally disposed piston 18a located within a generally horizontally disposed cylinder 10a and provided with a ring assembly 45a which is an alternative embodiment of the invention. It will be understood that the cylinder 10a, except for the omission of the groove 62, is identical to the aforedescribed cylinder 10; and that, hence, parts of the cylinder 10a similar to those of the cylinder 10 have been identified by the reference character for their previously described, similar part followed by the suffix a. It will also be understood that the piston rod 20a is suitably connected to a conventional crank or other driving means (not shown) to cause reciprocation of the piston 18a in the cylinder bore 14a; and that all of the aforegoing description of the general arrangement of the piston 18 and cylinder 10 is also applicable to the piston 18a and and the cylinder 10a.

Referring more particularly to the ring assembly 45a, the latter comprises a first ring element 64 mounted circumferentially around the forward (or right hand, as viewed in FIG. 7) end of the piston 18a, and a second ring element 66 mounted circumferentially around the rearward (or left hand) end thereof. The ring elements 64, 66 are located in abutment with annular shoulders 68, 70, respectively, formed circumferentially around the piston 18a, and may be constructed from any conventional piston ring material.

A pair of elongated sealing elements or strips 72, 74, arranged on opposing sides of the piston 18a adjacent the lower end thereof, extend longitudinally along the piston 18a for a substantial portion of the length of the latter. The sealing elements 72, 74 may be formed from any conventional piston ring material, and are each rigidly connected at their opposing ends to the ring elements 64, 66 by slots or recesses 76, 78, respectively, formed in the latter. The sealing elements 72, 74 thus form the opposing side walls of a chamber 80, located beneath the piston 18a, which extends longitudinally along the piston 18a for a substantial portion of the length thereof. This chamber 80, moreover, is closed at its upper end by the piston 18a, and communicates with the bore 40a throughout the reciprocation of the piston 18a. The ring elements 64, 66 and the sealing elements 72, 74 are biased from the piston 18a, and towards the cylinder wall 16a, by expander rings 82, 84, carried by the piston 18a beneath the ends of the sealing elements 72, 74 in the slots 76, 78, in ring grooves 86, 88, respectively.

The operation of the embodiment of the invention illustrated in FIGS. 5 through 7 is believed to be apparent from the aforegoing description.

FIGS. 8 and 9, wherein parts similar to those hereinbefore described with reference to the apparatus shown in FIGS. 1–4, are designated by the reference character for their previously described similar part followed by the suffix b, illustrates a ring assembly 45b which is particularly adapted for employment with a generally vertical piston 18b reciprocating in a generally vertical cylinder 10b. The ring assembly 45b, as will be noted, differs from the aforedescribed ring assembly 45 only in that the support ring 46b carries a pair of spaced, closed sealing loops 56b, each identical in construction and formation to the endless sealing loop 56. The cylinder 10b, similarly, differs from the aforedescribed cylinder 10 only in that it includes a groove 62b receiving each of the endless sealing loops 56b, such grooves 62b receiving fluid discharged from the cylinder bore 14b through a common annular bore 38b and individual bores 40b.

In the operation of the arrangement shown in FIGS. 8 and 9, pressurized fluid flows through the annular bore 38b and the bores 40b into the chambers 60b peripherally defined by the endless sealing loops 56b. The pressurized fluid entrapped in the chambers 60b acts on the piston 18b to support the latter out of engagement with the wall 16b of the cylinder bore 14b. Therefore, although the piston 18b and the cylinder 10b are vertically disposed, the advantages accruing from the present invention are attained by the ring assembly 45b.

FIGS. 10 and 11, wherein parts similar to those hereinbefore described with regard to the apparatus shown in FIGS. 1–7 are designated by the reference character for their similar previously described part followed by the suffix c, illustrates a ring assembly 45c which also is adapted for employment on a generally vertical piston 18c disposed in a generally vertical cylinder 10c. The ring assembly 45c, as will be seen from FIGS. 10 and 11, differs from the aforedescribed ring assembly 45a only in that it includes an additional pair of sealing elements 72c, 74c cooperating to bound a chamber 80c on a second side of the piston 18c. The sealing elements 72c, 74c are, of course, all identical in construction and arrangement to the sealing elements 72, 74 shown in FIGS. 5–7. The cylinder 10c, similarly, is identical to the before-described cylinder 10a except that it includes a bore 40c communicating with each of the chambers 80c, the bores 40c receiving fluid from a common annular bore 38c.

The operation of the apparatus shown in FIGS. 10 and 11 is believed to be apparent from the aforegiven description.

From the foregoing it will be seen that we have provided new and improved means for accomplishing all of the objects and advantages of our invention. It will be understood, however, that although we have illustrated and hereinbefore specifically described only four embodiments of the invention, the invention is not limited merely to these four embodiments but rather contemplates other embodiments within the scope of the following claims.

Having thus described our invention, we claim:

1. In combination, a cylinder body containing a wall peripherally defining a cylinder bore, a piston movably disposed in said cylinder bore for reciprocating movement therein, a first ring element carried by said piston circumferentially therearound adjacent one end of the piston, a second ring element carried by said piston circumferentially therearound adjacent the other end of the piston, a pair of elongated sealing elements carried by said piston to extend longitudinally along its circumference for a substantial portion of the length of the piston, said sealing elements being spaced circumferentially of the piston and co-operating to define a chamber which extends therebetween longitudinally along the circumference of said piston for a substantial portion of the length of the piston, said sealing elements being connected adjacent their opposing ends to said ring elements, and passage means for supplying pressurized fluid to said chamber during reciprocation of said piston whereby such pressurized fluid supports said piston in said cylinder bore.

2. The combination of claim 1, wherein said ring elements each include a pair of circumferentially spaced recesses, said recesses receiving the ends of said sealing elements for connecting said sealing elements to said ring elements.

3. The combination of claim 2, further comprising an expander ring circumferentially around said piston beneath each of said ring elements, said expander rings biasing said ring elements and the ends of said sealing elements towards said wall of said cylinder bore.

4. The combination of claim 2, further comprising a second pair of elongated sealing elements carried by said piston to extend longitudinally along the circumference of the piston for a substantial portion of the length of the piston, said second pair of sealing elements being spaced circumferenitally of the piston and cooperating to define a second chamber which extends therebetween longitudinally along the circumference of said piston for a substantial portion of the length of said piston, said ring elements each also including a pair of circumferentially spaced recesses receiving the ends of the sealing elements of said second pair for connecting these sealing elements to said ring elements, and passage means for supplying pressurized fluid to said second chamber during reciprocation of said piston whereby such pressurized fluid supports said piston in said cylinder bore.

5. The combination of claim 4, further comprising an expander ring circumferentially around said piston beneath each of said ring elements, said expander rings biasing said ring elements and the ends of the sealing elements towards said wall of said cylinder bore.

6. In combination, a cylinder body containing a wall peripherally defining a cylinder bore, a piston movably disposed in said cylinder bore for reciprocating movement therein, a support ring carried by said piston circumferentially therearound intermediate the ends of said piston, sealing means carried by said support ring and extending along the circumference of said piston for a substantial portion of the length of said piston, said sealing means enclosing a chamber which also extends longitudinally along the circumference of said piston for a substantial portion of the length of said piston, said wall including a longitudinally extending groove adapted to receive said sealing means and said sealing means being slidably disposed in said groove, and passage means for supplying pressurized fluid to said chamber during reciprocation of said piston whereby such pressurized fluid supports said piston in said cylinder bore.

7. The combination of claim 1, further comprising:
said passage means being formed through said wall in communication with said chamber and arranged to supply pressurized fluid to said chamber throughout the reciprocation of said piston.

8. The combination of claim 1, further comprising:
an expander ring carried by said piston for urging said sealing elements towards said wall.

9. The combination of claim 6, further comprising:
said passage means comprising a passage formed through said wall in communication with said chamber.

10. The combination of claim 6, further comprising:
said cylinder bore and said piston being generally horizontally disposed, said chamber being formed beneath said piston, and said passage being formed through said wall beneath said piston.

11. The combination of claim 6, further comprising:
said support ring carrying a plurality of said sealing means; and
said passage means including a passage formed through said wall in communication with each of the chambers formed by said sealing means.

12. The combination of claim 11, further comprising:
said wall including a plurality of longitudinally extending grooves; and
each of said sealing means being slidably disposed in one of said grooves.

13. The combination of claim 6, further comprising:
said sealing means comprising a generally ovate shaped, endless sealing loops molded integrally with said support ring.

14. The combination of claim 12, wherein each of said sealing means comprises a generally ovate shaped, endless sealing loop molded integrally with said support ring.

References Cited

UNITED STATES PATENTS

| | | | |
|---|---|---|---|
| 1,162,775 | 12/1915 | Hesselman | 92—86 |
| 1,289,168 | 12/1918 | Heginbottom | 92—86 X |
| 2,411,020 | 11/1946 | Blasutta | 92—82 |
| 2,648,290 | 8/1953 | Ashton et al. | 103—175 |
| 3,035,879 | 5/1962 | Hänny et al. | 230—188 X |
| 3,137,439 | 6/1964 | Hänny et al. | 230—188 |
| 3,177,861 | 4/1965 | Quillian | 92—82 X |

DONLEY J. STOCKING, Primary Examiner

W. J. KRAUSS, Assistant Examiner

U.S. Cl. X.R.

92—83